(12) United States Patent
Takahashi

(10) Patent No.: US 10,427,467 B2
(45) Date of Patent: Oct. 1, 2019

(54) PNEUMATIC TIRE

(71) Applicant: TOYO TIRE & RUBBER CO., LTD., Osaka-shi, Osaka (JP)

(72) Inventor: Souichi Takahashi, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 900 days.

(21) Appl. No.: 14/814,593

(22) Filed: Jul. 31, 2015

(65) Prior Publication Data

US 2016/0039249 A1   Feb. 11, 2016

(30) Foreign Application Priority Data

Aug. 6, 2014   (JP) ................................ 2014-160633

(51) Int. Cl.
 *B60C 11/00* (2006.01)
 *B60C 11/03* (2006.01)
 *B60C 11/12* (2006.01)
 *B60C 11/04* (2006.01)
 *B60C 11/13* (2006.01)

(52) U.S. Cl.
 CPC .......... *B60C 11/12* (2013.01); *B60C 11/0083* (2013.01); *B60C 11/04* (2013.01); *B60C 11/1236* (2013.01); *B60C 11/0304* (2013.01); *B60C 11/0306* (2013.01); *B60C 11/1376* (2013.01); *B60C 2011/1209* (2013.01); *B60C 2011/129* (2013.01); *B60C 2011/1295* (2013.01)

(58) Field of Classification Search
 CPC ............. B60C 11/1376; B60C 11/0083; B60C 11/0304; B60C 11/0306; B60C 11/04; B60C 11/12; B60C 11/1236; B60C 2011/1209; B60C 2011/129; B60C 2011/1295
 See application file for complete search history.

(56) References Cited

U.S. PATENT DOCUMENTS

2013/0081744 A1   4/2013  Kameda et al.
2016/0280012 A1*  9/2016  Uchida ............... B60C 11/0083

FOREIGN PATENT DOCUMENTS

JP   2005-263180 A   9/2005
JP   2008-195100 A   8/2008

OTHER PUBLICATIONS

Office Action dated Nov. 14, 2016, issued in counterpart Chinese Application No. 201510468545.X, with abridged English translation. (12 pages).
Office Action dated Aug. 9, 2018, issued in counterpart German application No. 10 2015 215 015.1, with English translation. (10 pages).

* cited by examiner

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

Provided is a pneumatic tire 1 on which mediate land portions 23a, 23a are formed. Sipes 24 are formed in the mediate land portions 23a, 23b respectively. The mediate land portion 23a disposed inside in a vehicle width direction in a state where the pneumatic tire 1 is mounted on a vehicle has larger sipe density and projects more outwardly in a tire radial direction than the mediate land portion 23b disposed outside in the vehicle width direction in a state where the pneumatic tire 1 is mounted on the vehicle.

7 Claims, 4 Drawing Sheets

PNEUMATIC TIRE

CROSS-REFERENCE TO RELATED APPLICATION

This application is based upon and claims the benefit of priority from Japanese Patent Application No. 2014-160633, filed Aug. 6, 2014; the entire contents of which are incorporated herein by reference.

TECHNICAL FIELD

The present invention relates to a pneumatic tire.

BACKGROUND ART

As one of the configurations of a pneumatic tire which can enhance steering stability, there has been known a configuration where a rib of a tread projects outwardly in the tire radial direction, and an apex of a projecting portion is offset more inwardly than the center of the rib in the width direction when the tire is mounted on a vehicle (for example, see JP-A-2005-263180 (Patent literature 1)).

SUMMARY OF INVENTION

Also density of sipes on a rib or a block influences the steering stability. For example, when the sipe density is large, a tire can acquire good steering stability on snow. However, when the sipe density is large, the rigidity of ribs or blocks is decreased and hence, the tire cannot acquire good steering stability on a dry road surface, particularly, at the time of cornering under a high-load condition. On the other hand, when the sipe density is small, although the tire can acquire good steering stability on a dry road surface at the time of cornering under a high-load condition, the tire cannot acquire good steering stability on snow.

The present invention has been made under such circumstances, and it is an object of the present invention to provide a pneumatic tire which can acquire both good steering stability on snow and good steering stability on a dry road surface at the time of cornering under a high-load condition.

A pneumatic tire of this embodiment is directed to a pneumatic tire where a mediate land portion is formed adjacently to shoulder land portions disposed on both sides of the tire in a tire width direction respectively, wherein sipes are formed in the mediate land portions respectively, the mediate land portion which is disposed inside in a vehicle width direction in a state where the tire is mounted on a vehicle has larger sipe density and projects more outwardly in a tire radial direction than the mediate land portion which is disposed outside in the vehicle width direction.

According to the pneumatic tire of the embodiment, the tire can acquire both good steering stability on snow and good steering stability on a dry road surface at the time of cornering under a high-load condition.

DESCRIPTION OF EMBODIMENTS (Structure of Pneumatic Tire 1)

Figure 1:
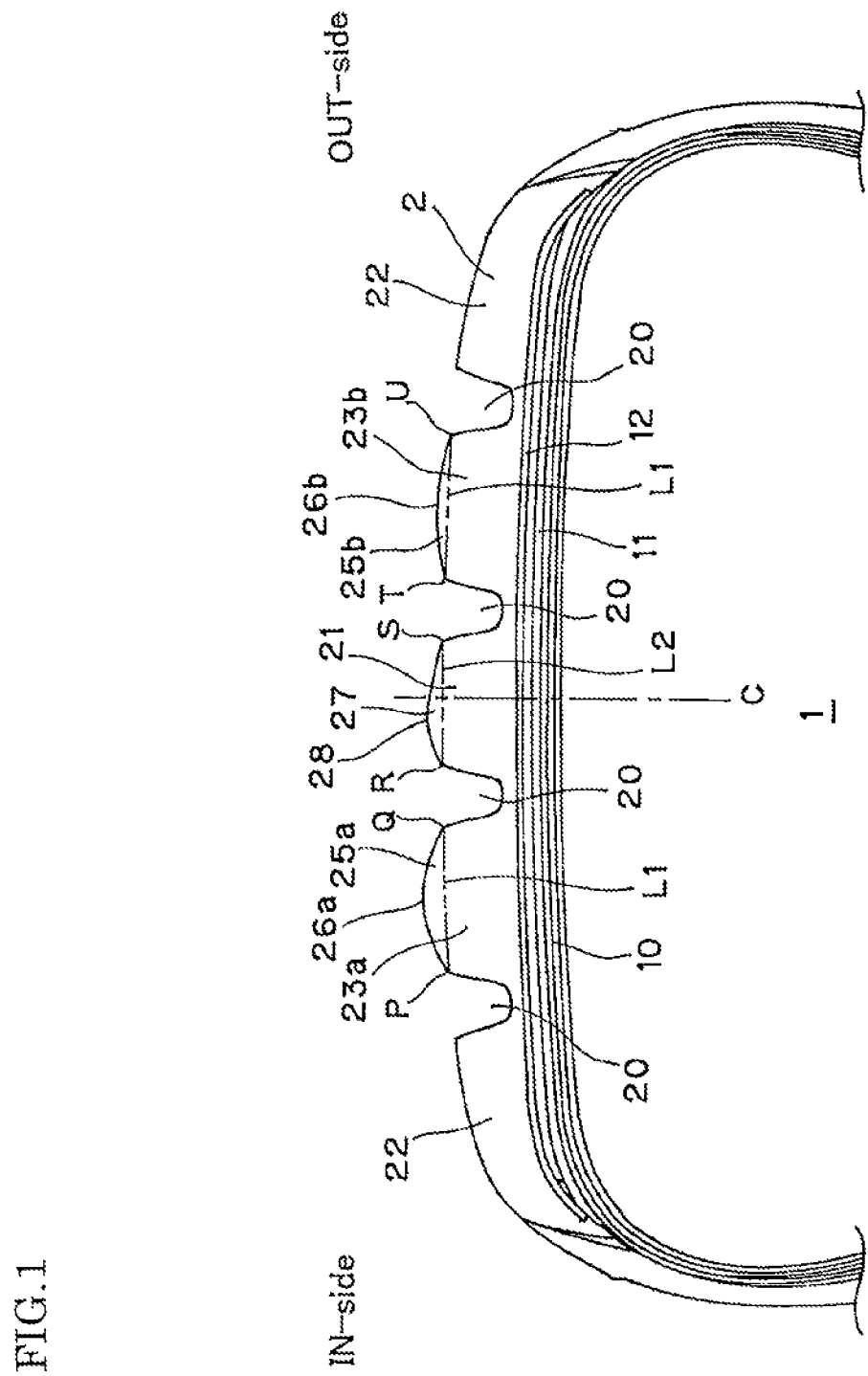
FIG. 1 is a cross-sectional view of a pneumatic tire 1 around a tread 2 in a width direction.

As shown in FIG. 1, the cross-sectional structure of a pneumatic tire 1 of the embodiment is the conventionally known structure except for a tread 2, and includes a bead portion, and a carcass 10 which is folded back from the inside to the outside in the tire width direction in the form where the carcass encloses the bead portion. A belt layer 11, a belt reinforcing layer 12, and the tread 2 are laminated in this order to an outer side of the carcass 10 in the tire radial direction. Besides these members, the tire includes various members corresponding to a function of the tire depending on a function required by the tire.

Figure 2:
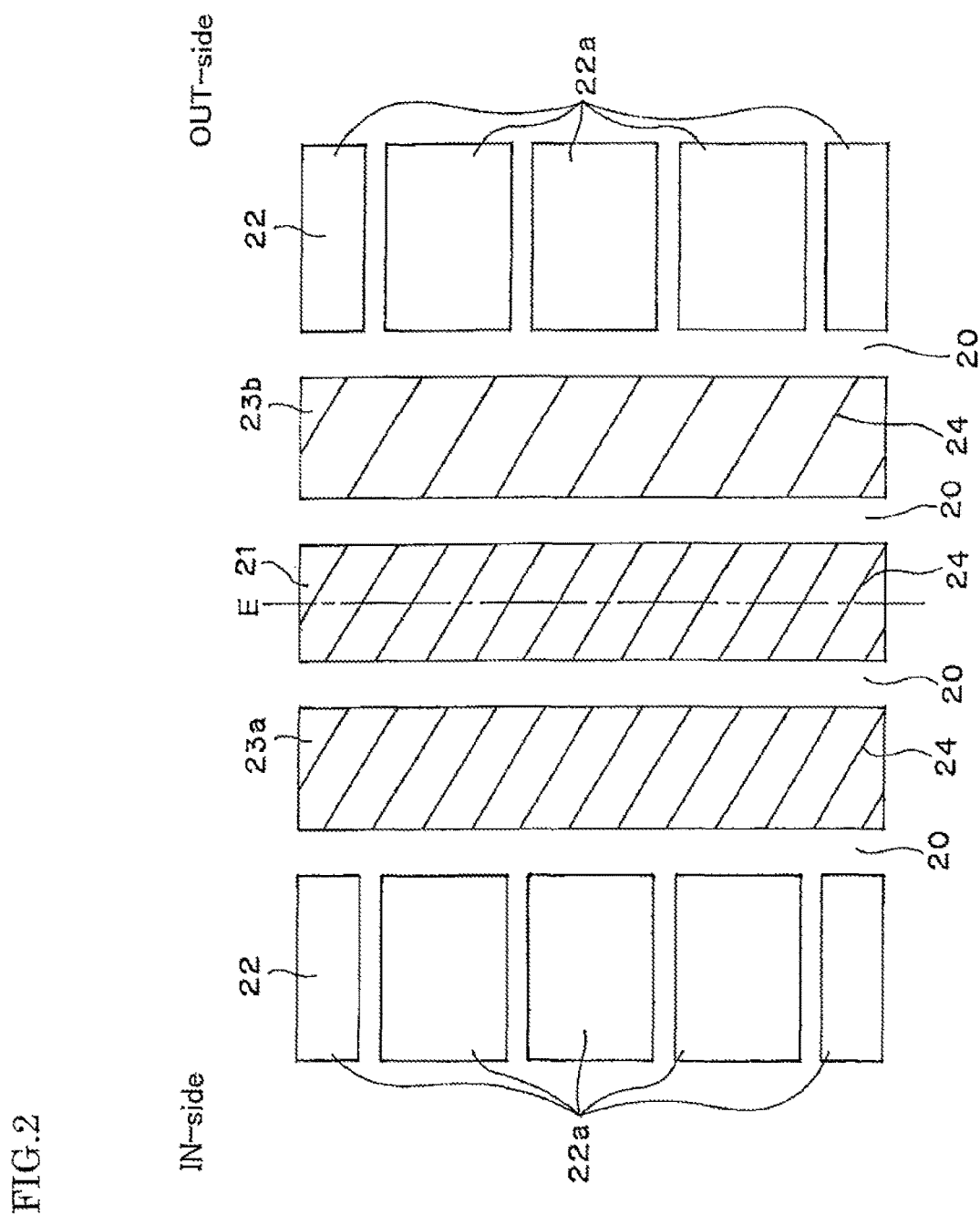
FIG. 2 shows a tread pattern of the pneumatic tire 1.
Figure 3:
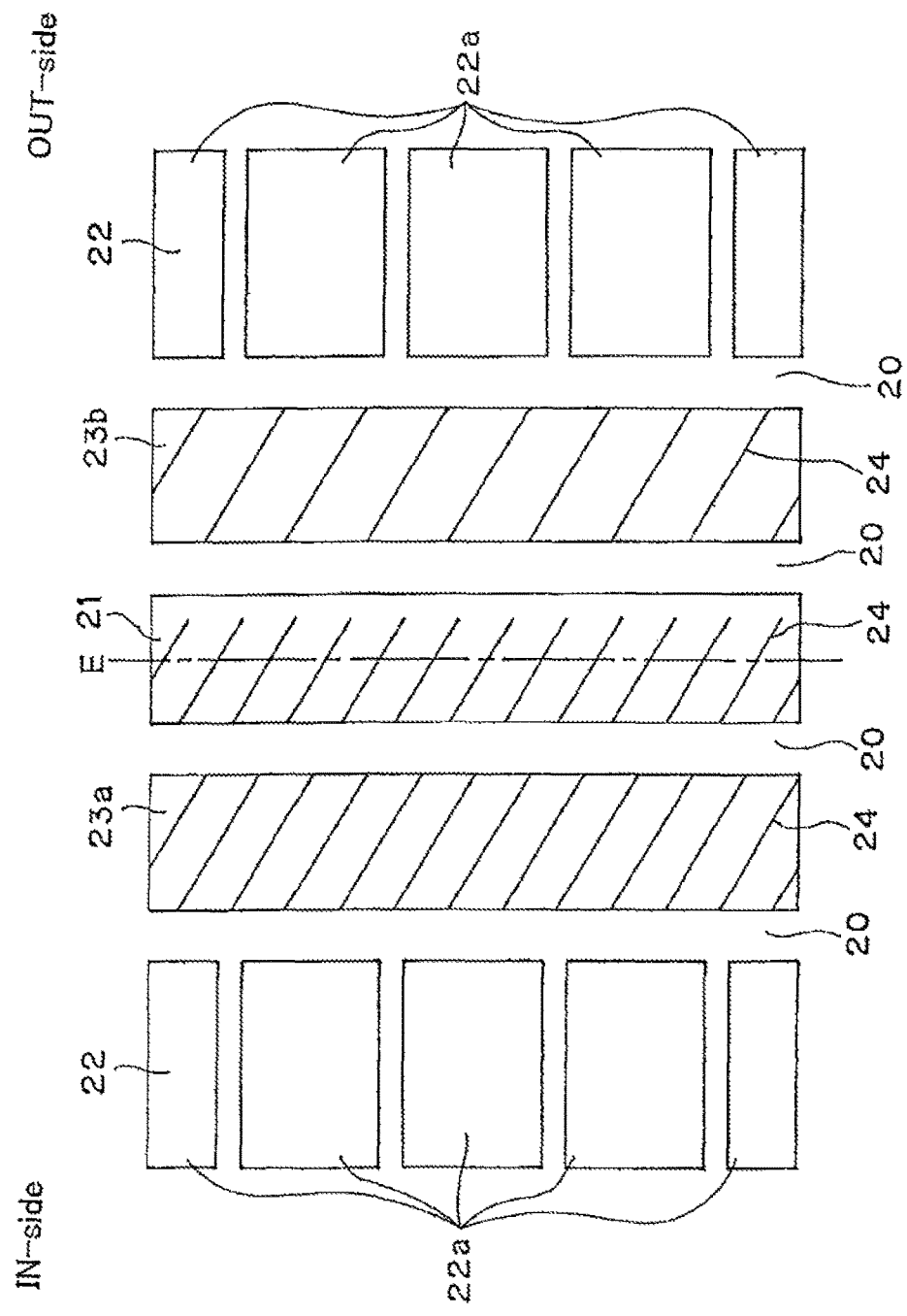
FIG. 3 shows another tread pattern of the pneumatic tire 1.

As shown in FIG. 1 to FIG. 3, four main grooves 20 which extend over the whole circumference of the tire are formed on the tread 2. Accordingly, the tread 2 is divided into a center land portion 21 disposed at the center in the tire width direction, shoulder land portions 22, 22 disposed on both sides in the tire width direction, and mediate land portions 23a, 23b respectively positioned between the center land portion 21 and the shoulder land portions 22, 22 by the main grooves 20. The center land portion 21 includes a tire equator E within a range thereof in the with direction. In this embodiment, the center land portion 21 and the mediate land portions 23a, 23b are respectively formed of a rib which extends over the whole circumference of the tire without being divided by transverse grooves. On the other hand, the shoulder land portion 22 is formed of a plurality of blocks 22a disposed in a row in the tire circumferential direction.

The mounting direction of the pneumatic tire 1 on the vehicle is fixed. Assume that the mediate land portion disposed inside in the vehicle width direction (hereinafter referred to as "IN side") in a state where the pneumatic tire 1 is mounted on the vehicle as an IN-side mediate land portion 23a, and the mediate land portion disposed outside in the vehicle width direction (hereinafter referred to as "OUT side") in a state where the pneumatic tire 1 is mounted on the vehicle as an OUT-side mediate land portion 23b.

As shown in FIG. 2 and FIG. 3, sipes 24 are formed in the mediate land portions 23a, 23b. The sipe density of the IN-side mediate land portion 23a is larger than the sipe density of the OUT-side mediate land portion 23b. Here, the sipe density means a total length of the sipes 24 which appear on a ground contact surface per unit area of the ground contact surface. It is desirable that a ratio of the sipe density of the IN-side mediate land portion 23a to the sipe density of the OUT-side mediate land portion 23b the sipe density of the IN-side mediate and portion 23a/the sipe density of the OUT-side mediate land portion 23b) fall within a range of 1.2 to 3.5 inclusive.

As shown in FIG. 1, projecting portions 25a, 25b which project outwardly in the tire radial direction from a tire reference profile line L1 are formed on the mediate land portions 23a, 23b respectively. In this case, at is desirable that the mediate land portions 23a, 23b project outwardly in the tire radial, direction from the tire reference profile line L1 as a whole as shown in the drawing rather than being formed on portions of the mediate land portions 23a, 23b respectively. The tire reference profile line L1 is indicated by a double-dashed chain line in FIG. 1. The tire reference profile line L1 of the IN-side mediate land portion 23a is expressed by an arc which passes three points P, Q, R, that is, both end portions P, Q of the IN-side mediate land portion 23a in the tire width direction, and the end portion R on an IN-side mediate land portion 23a side of the land portion disposed inside the IN-side mediate land portion 23a in the tire width direction that is, the center land portion 21). Further, the tire reference profile line L2 of the OUT-side mediate land portion 23b is expressed by an arc which passes three points S, T, U, that is both end portions T, U of the OUT-side mediate land portion 23b in the tire width direction, and the end portion S on an OUT-side mediate land portion 23b side of the land portion disposed inside the OUT-side mediate land portion. 23b in the tire width direction that is, the center land portion 21).

A projecting amount of the IN-side projecting portion 25a is larger than a projecting amount of the OUT-side projecting portion 25b. It is desirable that an apex 26a of the IN-side projecting portion 25a (a portion which projects most from the tire reference profile line L1 in the direction perpendicular to the tire reference profile line L1) project higher than an apex 26b of the OUT-side projecting portion 25b by an amount which falls within a range of 0.2 mm to 1.5 mm inclusive. Here, "project higher" means that the apex projects in the direction perpendicular to the tire reference profile line L1.

The OUT-side mediate land portion 23b may not project outwardly in the tire radial direction from the tire reference profile line L1. In this case, it is desirable that the apex 26a of the IN-side projecting portion 25a project from the tire reference profile line L1 by an amount which falls within a range of 0.2 mm to 1.5 mm inclusive.

As shown in FIG. 1, it is desirable that a projecting portion 27 be formed on the center land portion 21 so as to project outwardly in the tire radial direction from a tire reference profile line L2. In this case, it is desirable that the center land portion 21 project outwardly in the tire radial direction from the tire reference profile line L2 as a whole as shown in the drawing rather than being formed on a portion of the center land portion 21. Here, an arc which passes three points Q, R, S and an arc which passes three points R, S, T are induced from both end portions R, S of the center land portion 21 in the width direction and the respective end portions Q, T of two mediate land portions 23a, 23b disposed inside in the width direction, and the arc having a larger radius of curvature is set as the tire reference profile line L2.

A projecting amount of the projecting portion 27 of the center land portion 21 is smaller than a projecting amount of the projecting portion 25a of the IN-side mediate land portion 23a. It is desirable that the apex 26a of the projecting portion 25a of the IN-side mediate land portion 23a project higher than an apex 28 of the projecting portion 27 of the center land portion 21 by an amount which falls within a range of 0.2 mm to 1.0 mm inclusive. Also in this case, "project higher" means that the apex projects in the direction perpendicular to the tire reference profile line L2. Further, it is desirable that the projecting amount of the projecting portion 27 of the center land portion 21 be larger than the projecting amount of the projecting portion 25b of the OUT-side mediate land portion 23b.

It is desirable that the apex 28 of the projecting portion 27 of the center land portion 21 be disposed more on an IN side than the center of the center land portion 21 in the width direction. It is more desirable that the apex 28 be disposed at a position displaced to an IN side from the center of the center land portion 21 in the width direction by a length which falls within a range of 25% to 50% of a half width of the center land portion 21.

As shown in FIG. 2 and FIG. 3, it is desirable that sipes 24 be formed in the center land portion 21. With respect to the sipe density of the center land portion 21, the sipe density on an IN side and the site density on an OUT side may be equal as shown in FIG. 2. However, it is desirable that the sipe density on an IN side from the center of the center land portion 21 in the width direction be larger than the sipe density on an OUT side from the center of the center land portion 21 in the width direction. Such a difference in the sipe density can be made by various methods. For example, as shown in FIG. 3, by forming the sipes 24 such that the sipes 24 open on an IN side of the center land portion 21 and de not open on an OUT side, a total length of the sipes 24 on an IN side becomes longer than a total length of the sipes 24 on an OUT side and hence, the sipe density on an IN side becomes larger than the sipe density on an OUT side. Further, by forming the sipes 24 such that intervals between the sipes 24 in the tire circumferential direction are narrow on an IN side and are wide on an OUT side, the sipe density on an IN side becomes larger than the sipe density on an OUT side.

In the explanation made heretofore, the tire reference profile lines L1, L2 and projecting amounts of the apexes 26a, 26b, 28 of the respective projecting portions 25a, 25b, 27 are values when the pneumatic tire 1 is mounted on a normal rim, the pneumatic tire 1 has a normal inner pressure, and no lead is applied to the pneumatic tire 1. The tire reference profile lines L1, L2 and projecting amounts of the apexes 26a, 26b, 28 can be obtained by measuring a tire shape in such a state using a laser shape measurement device. Here, the "normal rim" is "standard rim" stipulated in the JATMA standard, "Design Rim" stipulated in the TRA standard, or "Measuring Rim" stipulated in the ETRTO standard. The "normal inner pressure" is "highest air pressure" stipulated in the JATMA standard, "maximum value" described in "TIRE LOAD LIMITS AT VARIOUS COLD INFLATION PRESSURES" stipulated in the TRA standard, or "INFLATION PRESSURE" stipulated in the ETRTO standard. The "ground contact surface" is a surface, which is brought into contact with a flat road surface when the pneumatic tire 1 is mounted on the normal rim, the inner pressure of the pneumatic tire 1 is set to the normal inner pressure, and a load which is 80% of the maximum load capacity at the normal inner pressure is applied to the pneumatic tire 1.

(Advantageous Effects)

Figure 4A:
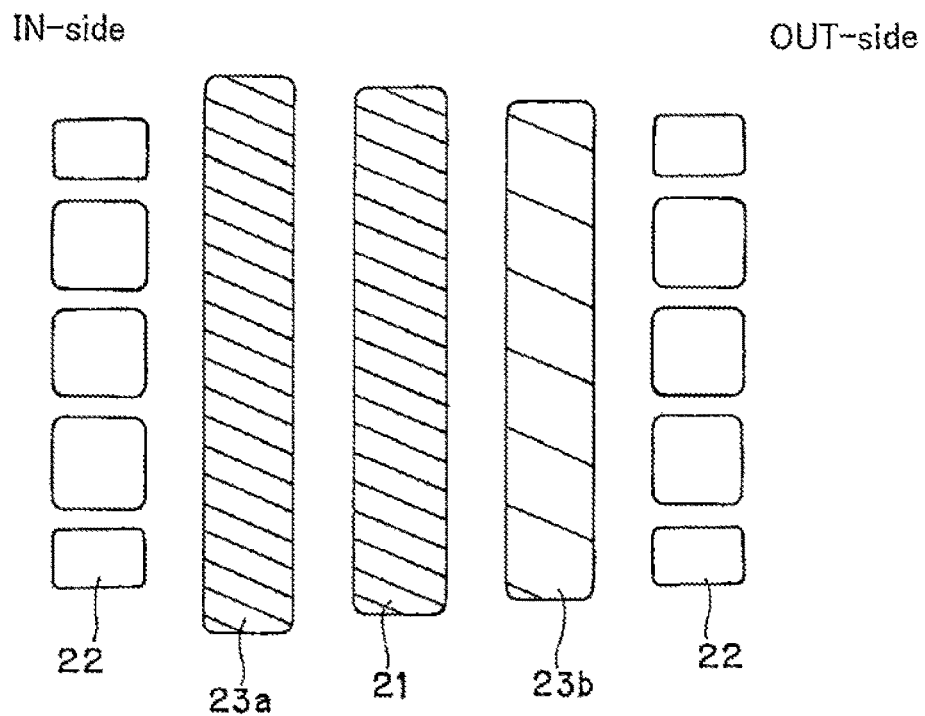
FIG. 4A and FIG. 4B are views showing a ground contact surface of the pneumatic tire 1.

As has been described heretofore, the projecting portion 25a whose projecting amount is larger than projecting amounts of other land portions is formed on the IN-side mediate land portion 23a. Accordingly, when the pneumatic tire 1 is brought into contact with a road surface and a load is applied to the IN side and the OUT side of the pneumatic tire 1, approximately uniformly, as shown in FIG. 4A, a ground contact surface of the IN-side mediate land portion 23a becomes larger than ground contact surfaces of other land portions. Accordingly, the IN-side mediate land portion 23a largely contributes to the steering stability. Here, the IN-side mediate land portion 23a has the large the sipe density and hence, the pneumatic tire 1 can acquire the excellent steering stability on snow thanks to such large the sipe density.

Figure 4B:
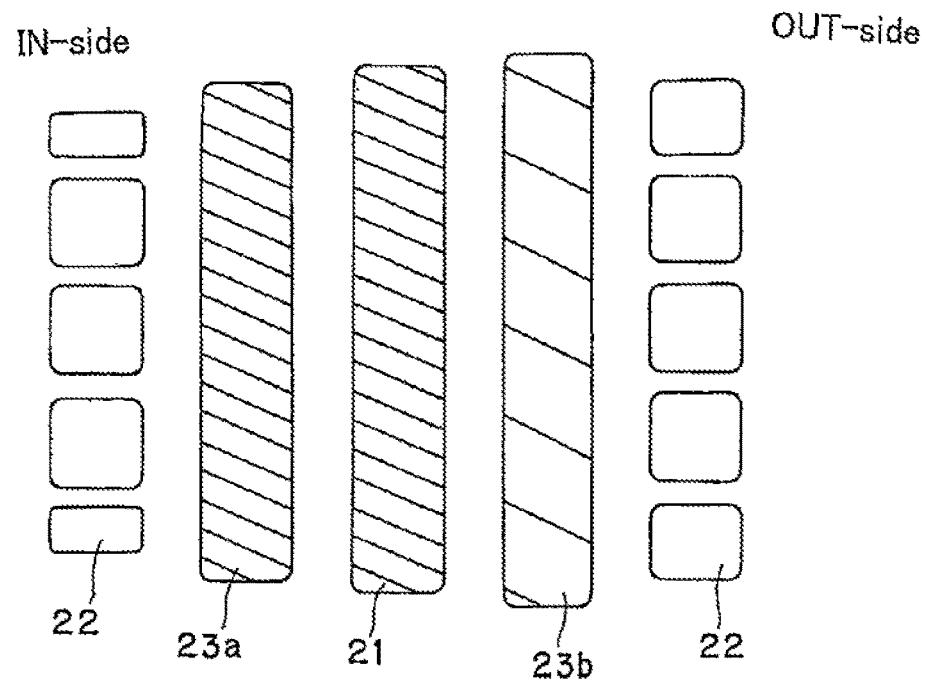

On the other hand, when a high load is applied to the OUT side of the pneumatic tire 1 at the time of cornering, as shown in FIG. 4B, the ground contact surface of the OUT-side mediate land portion 23b becomes larger than the ground contact surfaces of other land portions. Accordingly, the OUT-side mediate land portion 23b largely contributes to the steering stability. Here, the sipe density of the OUT-side mediate land portion 23b is small so that the OUT-side mediate land portion 23b has large rigidity and hence, the pneumatic tire 1 can acquire the excellent steering stability on a dry road surface at the time of cornering under a high-load condition.

In this manner, it is possible to acquire both good steering stability on a dry road surface at the time of cornering under a high-load condition and good steering stability on snow.

When a ratio of the sipe density of the IN-side mediate land portion 23a to the sipe density of the OUT-side mediate land portion 23b falls within a range of 1.2 to 3.5 inclusive, and the apex 26a of the IN-side projecting portion 25a projects higher than the apex 26b of the OUT-side projecting portion 25b by an amount which falls within a range of 0.2 mm to 1.5 mm inclusive, the pneumatic tire 1 can acquire the optimum balance between the steering stability on a dry road surface at the time of cornering under a high-load condition and the steering stability on snow.

Further, when not only the IN-side mediate land portion 23a and the OUT-side mediate land portion 23b but also the center land portion 21 project outwardly in the tire radial direction, the ground contact performance is improved so that the steering stability is enhanced. When a projecting amount of the center land portion 21 is smaller than a projecting amount of the IN-side mediate land portion 23a, there is no possibility that the contacting of the IN-side mediate land portion 23a on a ground is obstructed by the center land portion 21 and hence, the pneumatic tire 1 can acquire an advantageous effect brought about by a large projecting amount of the IN-side mediate land portion 23a.

Further, when the sipe density on an IN side of the center land portion 21 is set larger than the sipe density on an OUT side of the center land portion 21, and the apex 28 of the projecting portion 27 of the center land portion 21 is disposed on an IN side from the center of the center land portion 21 in the width direction, the center land portion 21 contributes to the acquisition of both good steering stability on snow and good steering stability at the time of cornering under a high-load condition. To be more specific, in a state where the pneumatic tire 1 is brought into contact with a ground and a load is applied to the IN side and the OUT side of the pneumatic tire 1 uniformly, a ground contact area of the IN-side portion of the center land portion 21 becomes larger than a ground contact area of the OUT-side portion of the center land portion 21. However, the sipe density of the IN-side portion of the center land portion 21 is large and hence, the steering stability on snow is improved. On the other hand, when a high load is applied to the OUT side portion at the time of cornering, a ground contact area of the OUT-side portion of the center land portion 21 becomes larger than a ground contact area of the IN-side portion of the center land portion 21. However, the sipe density of the OUT-side portion of the center land portion 21 is small and hence, the steering stability on a dry road surface at the time of cornering under a high-load condition is improved.

Here, when a ratio of the sipe density of the IN-side mediate land portion 23a to the sipe density of the OUT-side mediate land portion 23b falls within a range of 1.2 to 3.5 inclusive, the apex 26a of the IN-side projecting portion 25a projects higher than the apex 25b of the OUT-side projecting portion 25b by an amount which falls within a range of 0.2 mm to 1.5 mm inclusive, and the apex 26a of the IN-side projecting portion 25a projects higher than the apex 28 of the projecting portion 27 of the center land portion 21 by an amount which falls within a range of 0.2 mm to 1.0 mm inclusive, the pneumatic tire 1 can acquire the optimum balance between the steering stability on a dry road surface at the time of cornering under a high-load condition and the steering stability on snow.

When the displacement amount of the apex 28 of the projecting portion 27 of the center land portion 21 is shorter than a length which is 25% of a half width of the center land portion 21, in a state where a load is applied to the IN side and the OUT side of the center land portion 21 uniformly, there is no large difference in ground contact area between the IN side and the OUT side. Accordingly, an advantageous effect brought about by the large sipe density on the IN side of the center land portion 21 is small. Further, the displacement amount of the apex 28 is larger than a length which is 50% of the half width of the center land portion 21, there is no large difference in ground contact area between the IN side and the OUT side of the center land portion 21 at the time of cornering under a high-load condition. Accordingly, an advantageous effect brought about by small sipe density on the OUT side is small. However, when the displacement amount of the apex 28 of the projecting portion 27 of the center land portion 21 toward the IN side from the center of the center land portion 21 in the width direction is a length which falls within a range of 25% to 50% inclusive of a half width of the center land portion 21, these problems hardly occur.

EXAMPLE

The performances of pneumatic tires of comparative examples and pneumatic tires of examples shown in Table 1 are evaluated. In all pneumatic tires, the land portions are formed in a rib shape. The sipe densities in Table 1 are respectively expressed by an index when the sipe density in the comparative example 3 is set to 1, and the larger the index, the larger the sipe density becomes.

The pneumatic tire of the example 1 is a pneumatic tire where the sipe density of an IN-side mediate land portion and projecting amount of the IN-side mediate land portion projecting outwardly in the tire radial direction are larger than the sipe density of an OUT-side mediate land portion and a projecting amount of the OUT-side mediate land portion projecting outwardly in the tire radial direction. Further, the pneumatic tire of the example 2 is a pneumatic tire where a center rib projects outwardly in the tire radial direction, and a projecting amount of the center rib is smaller than a projecting amount of an IN-side mediate land portion. The pneumatic tire of the example 3 is a pneumatic tire where the sipe density on an IN side of the center rib is larger than the sipe density on an OUT side of the center rib and, further, an apex of a projecting portion of the center rib projecting outwardly in the tire radial direction is displaced to an IN side from the center of the center rib in the width direction.

The pneumatic tire of the comparative example 1 is a pneumatic tire where an OUT-side mediate rib largely projects outwardly in the tire radial direction than an IN-side mediate rib. The pneumatic tire of the comparative example 2 is a pneumatic tire where the sipe density of an OUT-side mediate rib is larger than the sipe density of an IN-side mediate rib. The pneumatic tire of the comparative example 3 is a pneumatic tire where none of ribs project outwardly in the tire radial direction.

The steering stability on now is evaluated in such a manner where straight traveling and lane change traveling are performed on snow and a driver performs sensory evaluation. The steering stability on a dry road surface is evaluated in such a manner where straight traveling and cornering traveling are performed on a dry road surface, and a driver performs sensory evaluation. In both evaluations, the steering stability is evaluated at seven levels ranging from 1 to 7 with the result of the comparative example 3 set to level 4. The table shows that the larger the numerical value of the evaluation, the more excellent the steering stability is.

The evaluation result is shown in Table 1. The evaluation of examples 1 to 3 is superior to the evaluation of the comparative examples 1 to 3 so that the advantageous effects of the pneumatic tire of the above-mentioned embodiment are ascertained.

(Modification)

The number of main grooves may be three or any number exceeding three. Regardless of the number of main grooves, land portions on both sides in the tire width direction are shoulder land portions respectively, and land portions disposed adjacently to the shoulder land portions are mediate land portions which possess substantially the same characteristics as the above-mentioned embodiment. There may be a case where the pneumatic tire has no center land portion. For example, several cases are considered including a case where the number of main grooves is three, and the center main groove agrees with the tire equator.

The center land portion and the mediate land portions may be respectively formed by arranging blocks in a row in the tire circumferential direction. Further, the shoulder land portions may be formed of a rib respectively. All land portions may be formed of a rib respectively. All land portions may be formed of a block respectively. Land portions formed of a rib and land portions formed of a block may be mixed. However, it is desirable that a tread pattern be formed in left-right symmetry with respect to the tire equator except for sipes.

TABLE 1

|  |  | Comparative example 1 | Comparative example 2 | Comparative example 3 | Example 1 | Example 2 | Example 3 |
|---|---|---|---|---|---|---|---|
| Characteristics | Projecting amount of IN-side mediate rib A (mm) | 0.3 | 0.5 | 0.0 | 0.5 | 0.5 | 0.5 |
|  | Projecting amount of OUT-side mediate rib B (mm) | 0.5 | 0.0 | 0.0 | 0.0 | 0.0 | 0.0 |
|  | Projecting amount of center rib C (mm) | 0.0 | 0.0 | 0.0 | 0.0 | 0.3 | 0.3 |
|  | Difference in projecting amount (A − B) | −0.2 | 0.5 | 0.0 | 0.5 | 0.5 | 0.5 |
|  | Difference in projecting amount (A − C) | 0.3 | 0.5 | 0.0 | 0.5 | 0.2 | 0.2 |
|  | Sipe density of IN-side mediate rib | 1.25 | 0.75 | 1.00 | 1.25 | 1.25 | 1.25 |
|  | Sipe density of OUT-side mediate rib | 0.75 | 1.25 | 1.00 | 0.75 | 0.75 | 0.75 |
|  | Presence or non-presence of sipe of center rib | Not present | Not present | Not present | Not present | Not present | Present |
|  | Ratio of sipe density between IN side and OUT side of center rib (IN/OUT) | — | — | — | — | — | 1.2 |
|  | Displacement amount of apex of projecting portion of center rib toward IN side (mm) | — | — | — | — | 0.0 | 2.0 |
|  | Half width of center rib (mm) | 5 | 5 | 5 | 5 | 5 | 5 |
| Result | Steering stability on snow | 2 | 3 | 4 | 5 | 6 | 6 |
|  | Steering stability on dry road surface | 3 | 3 | 4 | 5 | 5 | 5 |

The invention claimed is:

1. A pneumatic tire with mediate land portions formed adjacently to shoulder land portions disposed on both sides of the tire in a tire width direction respectively, wherein
sipes are formed in the mediate land portions respectively, the mediate land portion disposed inside in a vehicle width direction in a state where the pneumatic tire is mounted on the vehicle has larger sipe density and projects more outwardly in a tire radial direction than the mediate land portion disposed outside in the vehicle width direction,
wherein a ratio of the sipe density of the mediate land portion disposed inside in the vehicle width direction in a state where the pneumatic tire is mounted on the vehicle to the sipe density of the mediate land portion disposed outside in the vehicle width direction in a state where the pneumatic tire is mounted on the vehicle falls within a range of 1.2 to 3.5 inclusive,
an apex of the mediate land portion disposed inside in the vehicle width direction in a state where the pneumatic tire is mounted on the vehicle projects higher than an apex of the mediate land portion disposed outside in the vehicle width direction in a state where the pneumatic tire is mounted on the vehicle by an amount which falls within a range of 0.2 mm to 1.5 mm inclusive,
wherein the pneumatic tire includes a center land portion at the center thereof in the tire width direction, the center land portion projects outwardly in the tire radial direction from a tire reference profile line, and a projecting amount of the center land portion is smaller than a projecting amount of the mediate land portion disposed inside in the vehicle width direction in a state where the pneumatic tire is mounted on the vehicle, and
wherein sipes are formed in the center land portion, a portion of the center land portion disposed inside in the vehicle width direction in a state where the pneumatic tire is mounted on the vehicle has larger sipe density than a portion of the center land portion disposed outside in the vehicle width direction in a state where the pneumatic tire is mounted on the vehicle, and an apex of a projecting portion toward the outside in the tire radial direction is formed on a portion of the center land portion disposed inside in the vehicle width direction from the center of the center land portion in the width direction in a state where the pneumatic tire is mounted on the vehicle.

2. The pneumatic tire according to claim 1, wherein
an apex of the mediate land portion disposed inside in the vehicle width direction in a state where the pneumatic tire is mounted on the vehicle projects higher than an apex of the center land portion by an amount which falls within a range of 0.2 mm to 1.0 mm inclusive.

3. The pneumatic tire according to claim 1, wherein an apex of a projecting portion of the center land portion is disposed at a position displaced inwardly in the vehicle width direction from the center of the center land portion in the width direction in a state where the pneumatic tire is mounted on the vehicle by a length which falls within a range of 25% to 50% inclusive of a half width of the center land portion.

4. The pneumatic tire according to claim 1, further including
at least three or more main grooves extend around a circumference of a tread of the tire, including main grooves separating said mediate and shoulder land portions.

5. The pneumatic tire according to claim 4, wherein a projecting amount of the mediate land portion disposed inside in the vehicle width direction in a state where the pneumatic tire is mounted on the vehicle is larger than a projecting amount of all other land portions of the tire.

6. The pneumatic tire according to claim 4, wherein
wherein a projecting amount of another land portion in between said mediate land portions is smaller than a projecting amount of the mediate land portion disposed inside in the vehicle width direction in a state where the pneumatic tire is mounted on the vehicle and is larger than a projecting amount of the mediate land portion disposed outside in the vehicle width direction in a state where the pneumatic tire is mounted on the vehicle.

7. The pneumatic tire according to claim 4, wherein
sipes are formed in another land portion in between said mediate land portions,
a portion of said another land portion disposed inside in the vehicle width direction in a state where the pneumatic tire is mounted on the vehicle has larger sipe density than a portion of said another land portion disposed outside in the vehicle width direction in a state where the pneumatic tire is mounted on the vehicle.

* * * * *